United States Patent [19]

Coquin

[11] Patent Number: 5,798,712
[45] Date of Patent: Aug. 25, 1998

[54] METHOD AND DEVICE FOR SUPPLYING INFORMATION, AN ALERT OR ALARM FOR AN AIRCRAFT IN PROXIMITY TO THE GROUND

[75] Inventor: Laurent Coquin, Toulouse, France

[73] Assignee: Aerospatiale Societe Nationale Industrielle, Montmorency, France

[21] Appl. No.: 682,711

[22] PCT Filed: Nov. 23, 1995

[86] PCT No.: PCT/FR95/01545

§ 371 Date: Jul. 30, 1996

§ 102(e) Date: Jul. 30, 1996

[87] PCT Pub. No.: WO96/18935

PCT Pub. Date: Jun. 20, 1996

[30]       Foreign Application Priority Data

Dec. 15, 1994   [FR]   France ................... 94 15113

[51] Int. Cl.$^6$ ........................................... G08B 23/00
[52] U.S. Cl. ...................... 340/970; 340/961; 364/461
[58] Field of Search ........................ 340/970, 961, 340/963; 364/461, 439; 342/65

[56]            References Cited

U.S. PATENT DOCUMENTS

| | | | |
|---|---|---|---|
| 3,936,796 | 2/1976 | Bateman | 340/970 |
| 4,224,669 | 9/1980 | Brame | 340/970 |
| 4,646,244 | 2/1987 | Bateman et al. | 340/963 |
| 4,914,436 | 4/1990 | Bateman et al. | 340/970 |
| 4,916,448 | 4/1990 | Thor | 340/963 |
| 5,414,631 | 5/1995 | Denoize et al. | 340/963 |
| 5,442,556 | 8/1995 | Boyes et al. | 364/461 |
| 5,448,233 | 9/1995 | Saban et al. | 340/961 |
| 5,488,563 | 1/1996 | Chazelle et al. | 340/970 |

FOREIGN PATENT DOCUMENTS

| | | | |
|---|---|---|---|
| 0565399A1 | 10/1993 | European Pat. Off. . | |
| 85/03566 | 8/1985 | WIPO . | |
| 86/05023 | 8/1986 | WIPO . | |
| 8800749 | 1/1988 | WIPO | 340/970 |

OTHER PUBLICATIONS

*Aviation Week & Space Technology*, "Terrain Alert Graphics Tested on Cockpit Displays", Paul Proctor, Aug. 8, 1994, p. 51.

*Primary Examiner*—Brent A. Swarthout
*Attorney, Agent, or Firm*—Watson Cole Stevens Davis, P.L.L.C.

[57]            ABSTRACT

Information, an alert or an alarm is supplied to an aircraft in proximity to the ground. A grid of geographic coordinates is established, each mesh of which exhibits a defined relief. The trajectory of the aircraft is predicted over a predetermined time interval. An intersection, if any, between the predicted trajectory and the relief of at least one of the meshes is determined. An alert or alarm is activated in the case of such an intersection. The alert or alarm is inhibited when the aircraft is in landing configuration or when the runway is detected and a series of conditions relating to landing are fulfilled.

16 Claims, 3 Drawing Sheets

METHOD AND DEVICE FOR SUPPLYING INFORMATION, AN ALERT OR ALARM FOR AN AIRCRAFT IN PROXIMITY TO THE GROUND

FIELD OF THE INVENTION

The present invention relates to a method and a device for supplying information, an alert or alarm for an aircraft maneuvering above terrain with known relief, particularly in the vicinity of a runway for the aircraft, when the trajectory of the aircraft is capable of intercepting a relief of said terrain.

DESCRIPTION OF RELATED ART

It has proved to be necessary, for aircraft in flight, to provide an alarm system making it possible, in good time, to detect and signal proximity of the relief (in a general way, of the ground), which is a danger to the aircraft. A currently widespread system is GPWS, standing for "Ground Proximity Warning System". GPWS uses the radio altimeter measurement of the height of the aircraft above the ground situated in the vertical to its instantaneous position. The comparison of these radio-altimeter data and the vertical speed parameters, among others (pitot-static vertical speed and radio altimeter rate of approach to the ground), with respect to various predetermined thresholds, allows various types of visual and audible alarms to be triggered. Alarms make it possible to warn the pilot of a dangerous situation risking a collision with the ground in the near future if no corrective action is taken on the controls making it possible rapidly to regain sufficient altitude to guarantee the safety of the aircraft. The main drawback of this system lies in the high number of false alarms which it generates.

Another system of this type is also known, but based on a different principle from that used by GPWS, to evaluate the level of danger which the ground represents for the aircraft. In this case, the measured position of the aircraft in the horizontal and vertical planes is used so as to calculate a prediction of the changes in the various possible trajectories of the aircraft in the moments which follow the measurement, and to compare the envelope of these trajectories with the safety altitudes described in a ground-related database, calculated, particularly, from the various heights of the surface of the ground overflown by the predicted trajectories.

The detection of an intersection between the envelope of trajectories and the safety volume defined by the ground-related database makes it possible to predict that the aircraft risks departing from the range of safety altitudes in a time interval which is determined in advance. An alert or alarm can then be generated so as to warn the pilot of this danger situation so that he returns to an acceptable safety altitude as rapidly as possible.

In this system, the ground (terrain)-related database consists of the recording of safety altitudes corresponding to each of the meshes of the grid describing the terrain. The grid defines subdivisions of the surface of the earth which, for example, may be referenced in geographic coordinates. The grid then consists of a network of adjacent meshes. Each mesh has a safety altitude attributed to it, guaranteeing that overflying this mesh, at least at this altitude, will entail no collision with the terrain described in this mesh. The main drawback of this system lies in the short timescale left to the crew to react to certain rapid variations in the relief which are associated with a number, which may be high, of false alarms which they generate.

The alarm is generated based on the detection of a "conflict" (interception) between the trajectory of the aircraft and the relief of an element (mesh) of the ground- or terrain-related database.

The position (in terms of Ox, Oy and Oz coordinates) of the aircraft is extrapolated for an all-inclusive maximum anticipation time of the order of one minute or less (for example 30 or 60 seconds) along the direction of the ground speed vector (speed with respect to the ground).

This timescale has been chosen inclusively in order to include the following reaction times:

sensor reaction time;

alarm algorithm calculating time;

crew reaction time; this time depends on the phase of flight, since vigilance is variable in the course of a flight;

reaction time between the pilot's command and the movement of the control surfaces;

time characteristic of the minimum performance of the aircraft, depending on configuration (gears, flaps, engine failure, particularly);

time related to margins with respect to the terrain.

Prediction of the aircraft's trajectory is obtained by calculating the trajectory prediction segment in three dimensions. This means a linear extrapolation along the ground speed vector of the aircraft, that is to say making a tangent to the trajectory. Thereafter, the elements of the relief which the aircraft is likely to overfly during the extrapolation time are determined. For each mesh of the grid overflown, the predicted altitude of the aircraft at entry and exit to and from the mesh are calculated, using the vertical speed Vz of the aircraft. When the extrapolated trajectory segment of the aircraft intercepts a mesh of the terrain grid while having a predicted altitude less than the altitude of the region in question, the alarm is triggered.

Inevitably, there comes a moment in the trajectory prediction when the prediction segment intercepts the ground, during the landing phase, before touchdown. This alarm is known as a nuisance alarm, since it occurs while the aircraft is in the normal flight situation, the pilot starting the landing.

This signal is troublesome to the pilot, since he is accustomed to reacting quickly and in a certain way. However, if the treatment of an alarm is not unique and introduces confusion as to the type of safety action to be undertaken (in this case, an absence of action), the effectiveness of the corrective action will consequently be reduced, being less rapid.

SUMMARY OF THE INVENTION

The object of the present invention is to avoid this drawback.

To this end, the method for supplying information, an alert or alarm for an aircraft manoeuvering above terrain with known relief, especially in the vicinity of a runway for said aircraft, when the trajectory of the aircraft is capable of intercepting a relief of said terrain, in which:

for said terrain, a grid of geographic coordinates is established, each mesh of which has a defined relief, the trajectory of the aircraft, over a predetermined time interval, is predicted, any intersection between said trajectory and the relief of at least one of said meshes is determined, and an alert or alarm is triggered depending on the result of said determination, is noteworthy, according to the invention, in that a comparison is performed between the meshes of the grid which are intercepted by said predicted trajectory and the meshes containing the runway for the aircraft, so that, if the information supplied by said comparison is negative, the alert or alarm remains capable of being activated, and the alert or alarm is inhibited if the information supplied by said comparison is positive and if, moreover, the following conditions are simultaneously fulfilled:

- the ground speed of the aircraft is less than or equal to a predetermined threshold,
- the altitude of the aircraft above the ground is less than or equal to a predetermined threshold,
- the aircraft is at least substantially in the axis of the runway, and
- the aerodynamic configuration of the aircraft corresponds to the landing phase thereof.

Hence, criteria are defined making it possible to detect that the aircraft's approach to the ground is performed in an approach zone of a runway, while, at the same time, the normal landing conditions are fulfilled. Moreover, inhibition of the alert or alarm occurs a sufficient time in advance, equal at most to the time interval chosen (for example, 30 seconds) for the trajectory prediction.

Advantageously, for given terrain, in the vicinity of one or more runways contained in this terrain, a grid is established with finer meshing than anywhere else.

Preferably, as conditions of aerodynamic configuration of the aircraft which are associated with the landing phase, account is taken of the following criteria: slats and flaps extended, and landing gear lowered.

The present invention also relates to a device for supplying information, an alert or alarm, for implementing the method above, for an aircraft manoeuvering above terrain with known relief, particularly in the vicinity of a runway for said aircraft, when the trajectory of the aircraft is capable of intercepting a relief of said terrain, comprising:

- means of establishing a grid of geographic coordinates, for said terrain, each mesh of which exhibits a defined relief,
- means of predicting the trajectory of the aircraft over a predetermined time interval,
- means of determining any intersection between said predicted trajectory and the relief of at least one of said meshes, and
- alert or alarm means which are capable of being activated subject to said determination means, noteworthy in that it includes, between said determination means and said alert or alarm means, means for comparison between the meshes of said grid which are intercepted by said predicted trajectory and the meshes containing the runway for the aircraft, such that, if the information supplied by said comparison means is negative, said alert or alarm means remain capable of being activated, and said alert or alarm means are inhibited if the information supplied by said comparison means is positive and if, moreover, the following conditions are simultaneously fulfilled:

- the ground speed of the aircraft is less than or equal to a predetermined threshold,
- the altitude of the aircraft above the ground is less than or equal to a predetermined threshold,
- the aircraft is at least substantially in the axis of the runway, and
- the aerodynamic configuration of the aircraft corresponds to the landing phase thereof.

Advantageously, between said comparison means and said alert or alarm means, a logic element, such as an AND gate is provided, the inputs of which receive the information supplied by said comparison means when it is positive and the conditions relating to the situation and to the configuration of the aircraft, and the output of which is linked to said alert or alarm means.

BRIEF DESCRIPTION OF THE DRAWINGS

The figures of the attached drawing will give a good understanding of how the invention can be produced.

DETAILED DESCRIPTION OF THE PREFERRED EMBODIMENT

Figure 1:
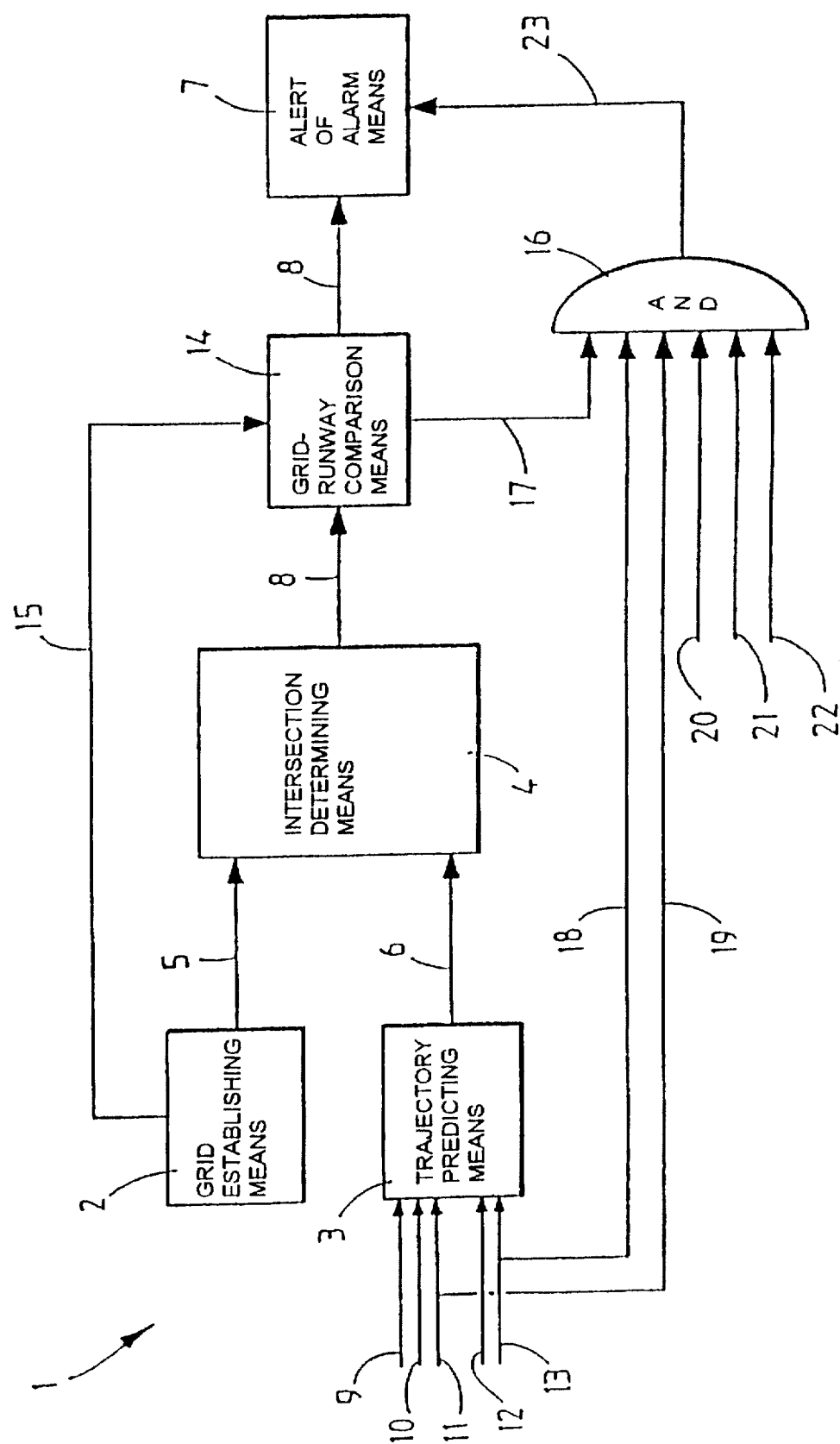
FIG. 1 is a block diagram of the device according to the invention.

With regard to FIG. 1, the device 1 for supplying information, an alert or alarm for an aircraft manoeuvering above terrain with known relief, particularly in the vicinity of a runway for said aircraft, when the trajectory of the aircraft is likely to intercept a relief of said terrain, comprises:

- means 2 of establishing a grid of geographic coordinates for said terrain, each mesh of which exhibits a defined relief,
- means 3 of predicting the trajectory of the aircraft over a predetermined time interval,
- means 4 of determining any intersection between said predicted trajectory and the relief of at least one of said meshes, said determination means 4 being linked to said means 2 of establishing the grid and to said trajectory prediction means 3 by respective links 5 and 6,
- alert or alarm means 7 capable of being activated subject to said determination means 4 to which they are linked by a link 8.

More precisely, the trajectory of the aircraft can be predicted, over a predetermined time interval, by inputting, into the prediction means 3, the information relating to the position of the aircraft at the initial instant: latitude 9, longitude 10, altitude 11; at the time interval 12 in question; and at the ground speed 13 of the aircraft.

Figure 2:
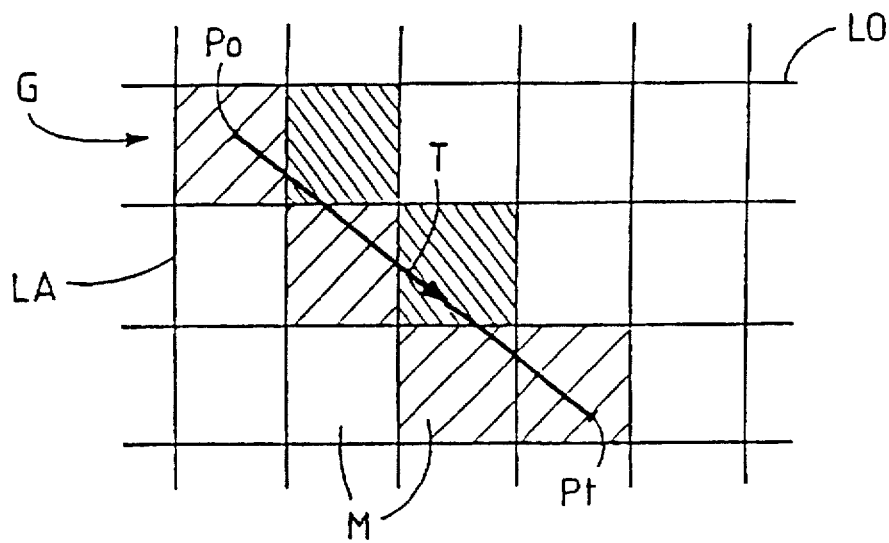
FIG. 2 shows a grid of geographic coordinates, certain meshes of which, with defined relief, are traversed by a segment of predicted trajectory of an aircraft.
Figure 3:
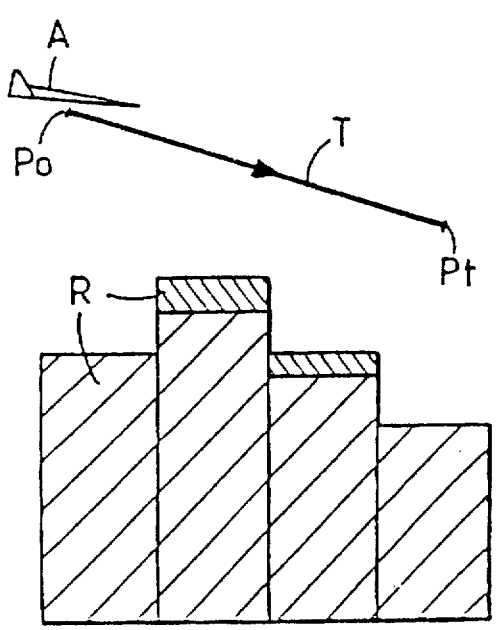
FIGS. 3 and 4, relating to the grid of FIG. 2, illustrate in elevation, respectively, the case where said predicted trajectory segment does and does not intercept the relief of a mesh of said trajectory.
Figure 4:
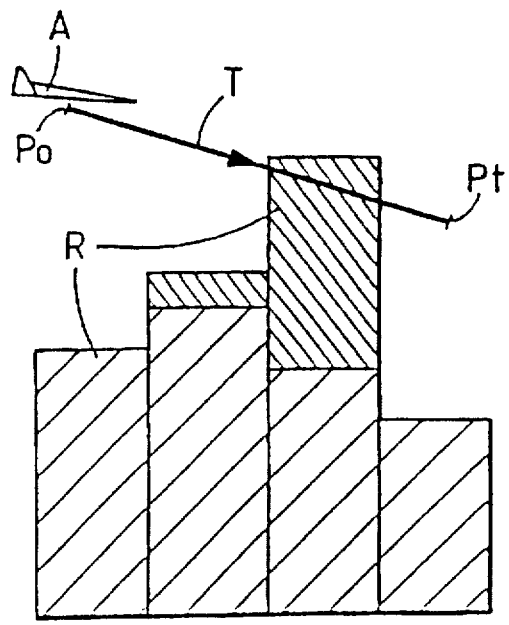

FIG. 2 shows a grid G of geographic coordinates LA, LO, certain meshes M of which, of defined relief R (as can be seen in FIGS. 3 and 4), are traversed by a segment of predicted trajectory T of the aircraft A, from a position Po to a position Pt. As indicated above, a simple trajectory prediction model can be used, considering the extrapolation of the ground speed vector of the aircraft over a predetermined extrapolation time t, equal, for example, to 30 seconds.

According to the trajectory segment thus predicted and the relief of the meshes traversed, it is possible to predict whether (FIG. 4) or not (FIG. 3) a risk exists that the predicted trajectory T of the aircraft A intercepts the relief of a mesh, and to do so sufficiently in advance in order to be able to remedy it in time, by virtue of the alert or alarm triggered at this moment.

Figure 5:
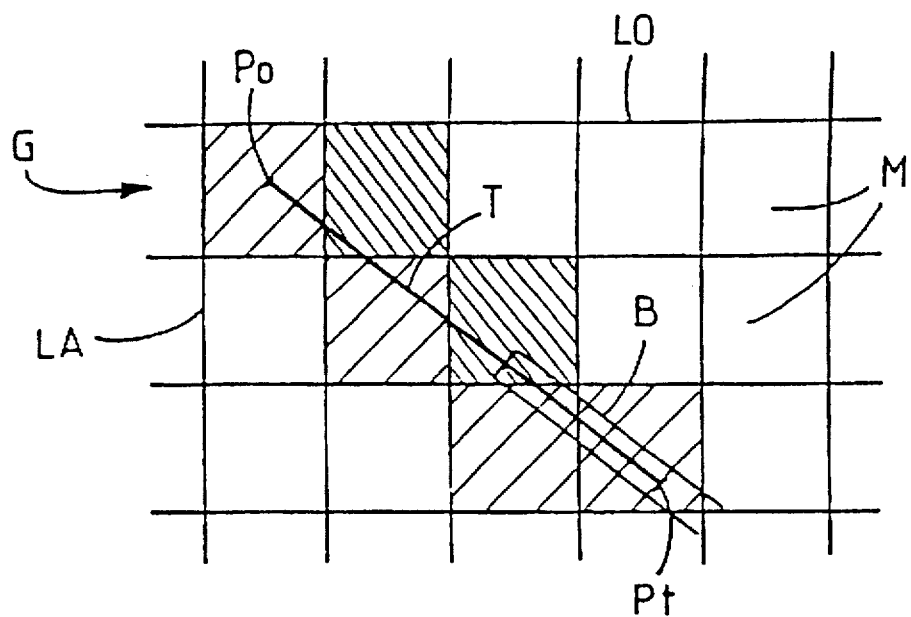
FIG. 5 shows a grid similar to that of FIG. 2 in the vicinity of a runway for the aircraft.
Figure 6:
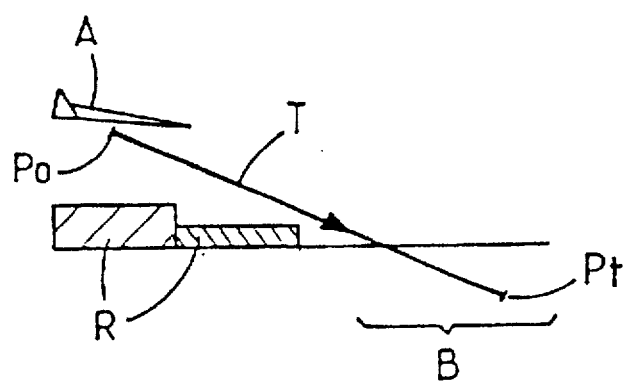
FIG. 6 is a view in elevation of FIG. 5.

However, as illustrated in FIGS. 5 and 6, this mode of operation inevitably entails the predicted trajectory T of the aircraft A "meeting" the ground, in the vicinity of a runway B, thus triggering an inadvertent alert or alarm.

In order to overcome this drawback, the device 1 according to the invention includes (FIG. 1), between the determination means 4 and the alert or alarm means 7, means 14 for comparison between the meshes of the grid G which are intercepted by the predicted trajectory T and the meshes containing the runway B for the aircraft A, such that, if the information supplied by the comparison means 14 (linked by the link 15 to the means 2 for establishing the grid) is negative (absence of "intersection" with the meshes of the runway), the alert or alarm means 7 remain capable of being activated, whereas they are inhibited if the information supplied by the comparison means 14 is positive (existence of an "intersection" with the meshes of the runway) and if, moreover, the following conditions [lacuna]:

the ground speed of the aircraft is less than or equal to a predetermined threshold (ground speed less than or equal to the maximum speed allowed in the course of the approach procedure), the altitude of the aircraft above the ground is less than or equal to a predetermined threshold (altitude less than or equal to the maximum decision altitude in the course of the approach procedure), the aircraft is at least substantially in the axis of the runway (with a certain latitude on either side of the axis so as to take account of any type of approach along this axis), the aerodynamic configuration of the aircraft corresponds to the landing phase thereof (slats and flaps extended, gear lowered).

As can be seen in FIG. 1, these various information items are sent to the inputs of an AND gate 16, namely:

positive comparison via the link 17, aircraft speed via the link 18, aircraft altitude via the link 19, aircraft heading via the link 20, aerodynamic configuration of the aircraft via the link 21, configuration of the landing gear via the link 22.

With all these conditions fulfilled simultaneously, the alert or alarm is inhibited (link 23 between the output of the AND gate 16 and the alert or alarm means 7). This means, for the pilot, an absence of visual and audible alarm information. Inhibition of the alarm thus occurs some time in advance, equal at most to the extrapolation time chosen for the trajectory, for example 30 seconds as already indicated.

It should moreover be noted that, in the vicinity of the runway, the definition of the grid of geographic coordinates of the terrain becomes fundamental. In other words, it is then necessary to have a sufficiently fine meshing in the immediate area around the runway so as to enhance precision in order unambiguously to determine whether the runway is actually being aimed at.

I claim:

1. A method for supplying information, an alert or an alarm for an aircraft manoeuvering above terrain with known relief, when a trajectory of the aircraft is capable of intercepting the relief of said terrain, the method comprising:

(a) establishing for said terrain a grid of geographic coordinates comprising a plurality of meshes, each of the plurality of meshes having associated therewith a defined portion of the relief;

(b) predicting the trajectory of the aircraft over a predetermined time interval;

(c) determining whether an intersection exists between said trajectory and the portion of the relief associated with at least one of said meshes;

(d) triggering the alert or alarm in accordance with a result of step (c);

(e) performing a comparison between (i) the meshes of the grid having portions of the relief which are determined in step (c) to have intersections with said predicted trajectory and (ii) the meshes containing portions of a runway for the aircraft to determine whether any of the meshes having the portions of the relief which are determined in step (c) to have intersections with the predicted trajectory also contains a portion of the runway, so that, if said comparison determines that none of the meshes having the portions of the relief also contains a portion of the runway, the alert or alarm remains capable of being activated, whereas the alert or alarm is inhibited if said comparison determines that at least one of the meshes having the portions of the relief also contains a portion of the runway and the following conditions are simultaneously fulfilled:

a ground speed of the aircraft is less than or equal to a predetermined threshold ground speed;

an altitude of the aircraft above the ground is less than or equal to a predetermined threshold altitude;

the aircraft is at least substantially in an axis of the runway; and an aerodynamic configuration of the aircraft corresponds to a landing phase of the aircraft.

2. The method as claimed in claim 1, wherein step (a) comprises establishing a first plurality of meshes in a vicinity of the runway and a second plurality of meshes outside the vicinity of the runway, the meshes of the first plurality of meshes being smaller than the meshes of the second plurality of meshes.

3. The method as claimed in claim 1, wherein the aerodynamic configuration of the aircraft comprise a state of extension of slats and flaps of the aircraft and a state of lowering of landing gear of the aircraft.

4. A device for supplying information, an alert or an alarm for an aircraft manoeuvering above terrain with known relief when a trajectory of the aircraft is capable of intercepting a relief of said terrain, the device comprising:

grid establishing means for establishing a grid of geographic coordinates comprising a plurality of meshes for said terrain, each of said plurality of meshes having associated therewith a defined portion of the relief;

trajectory predicting means for predicting the trajectory of the aircraft over a predetermined time interval;

intersection determining means for determining whether an intersection exists between said predicted trajectory and the portion of the relief associated with at least one of said meshes;

alert or alarm means for outputting the alert or alarm in accordance with a determination made by said determination means; and comparison means for making a comparison between (i) the meshes of said grid having portions of the relief which are determined by the intersection determining means to have intersections with said predicted trajectory and (ii) the meshes containing portions of a runway for the aircraft to determine, and to provide an output indicating, whether any of the meshes having the portions of the relief which are determined by the intersection determining means to have intersections with the predicted trajectory also contains a portion of the runway, such that, if said comparison means determines that none of the meshes having the portions of the relief also contains a portion of the runway, said alert or alarm means remain capable of being activated, whereas said alert or alarm means are inhibited if said comparison means determines that at least one of the meshes having the portions of the relief also contains a portion of the runway and the following conditions are simultaneously fulfilled:

a ground speed of the aircraft is less than or equal to a predetermined threshold ground speed;

an altitude of the aircraft above the ground is less than or equal to a predetermined threshold altitude;

the aircraft is at least substantially in an axis of the runway; and an aerodynamic configuration of the aircraft corresponds to a landing phase of the aircraft.

5. The device as claimed in claim 4, further comprising a logic element between said comparison means and said alert or alarm means, the logic element having inputs which receive the output supplied by said comparison means and signals representing said conditions, and the logic element also having an output which is linked to said alert or alarm means.

6. The method as claimed in claim 2, wherein the aerodynamic configuration of the aircraft comprises a state of extension of slats and flaps of the aircraft and a state of lowering of landing gear of the aircraft.

7. The device as claimed in claim 4, wherein the grid establishing means comprises means for establishing a first plurality of meshes in a vicinity of the runway and a second plurality of meshes outside the vicinity of the runway, the meshes of the first plurality of meshes being smaller than the meshes of the second plurality of meshes.

8. The device as claimed in claim 4, wherein the aerodynamic configuration of the aircraft comprises a state of extension of slats and flaps of the aircraft and a state of lowering of landing gear of the aircraft.

9. The device as claimed in claim 7, wherein the aerodynamic configuration of the aircraft comprises a state of extension of slats and flaps of the aircraft and a state of lowering of landing gear of the aircraft.

10. The device as claimed in claim 7, further comprising a logic element between said comparison means and said alert or alarm means, the logic element having inputs which receive the output supplied by said comparison means and signals representing said conditions, and the logic element also having an output which is linked to said alert or alarm means.

11. The device as claimed in claim 8, further comprising a logic element between said comparison means and said alert or alarm means, the logic element having inputs which receive the output supplied by said comparison means and signals representing said conditions, and the logic element also having an output which is linked to said alert or alarm means.

12. The device as claimed in claim 9, further comprising a logic element between said comparison means and said alert or alarm means, the logic element having inputs which receive the output supplied by said comparison means and signals representing said conditions, and the logic element also having an output which is linked to said alert or alarm means.

13. The device as claimed in claim 5, wherein the logic element comprises an AND gate.

14. The device as claimed in claim 10, wherein the logic element comprises an AND gate.

15. The device as claimed in claim 11, wherein the logic element comprises an AND gate.

16. The device as claimed in claim 12, wherein the logic element comprises an AND gate.

* * * * *